US010887229B2

(12) United States Patent
Cui et al.

(10) Patent No.: US 10,887,229 B2
(45) Date of Patent: Jan. 5, 2021

(54) SYSTEMS AND METHODS FOR TUNNEL FREE CONNECTIONLESS PACKET ROUTING TO A SERVICE EDGE

(71) Applicant: AT&T Intellectual Property I, L.P., Atlanta, GA (US)

(72) Inventors: Zhi Cui, Sugar Hill, GA (US); Jiansong Wang, North Parlin, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/280,311

(22) Filed: Feb. 20, 2019

(65) Prior Publication Data
US 2019/0182156 A1 Jun. 13, 2019

Related U.S. Application Data

(63) Continuation of application No. 15/479,505, filed on Apr. 5, 2017, now Pat. No. 10,230,632.

(51) Int. Cl.
H04L 12/741 (2013.01)
H04L 12/26 (2006.01)
H04L 29/06 (2006.01)
H04L 12/725 (2013.01)
H04L 12/24 (2006.01)
H04L 29/08 (2006.01)

(52) U.S. Cl.
CPC .......... H04L 45/74 (2013.01); H04L 41/5051 (2013.01); H04L 45/306 (2013.01); H04L 63/00 (2013.01); H04L 67/16 (2013.01); H04L 43/00 (2013.01)

(58) Field of Classification Search
None
See application file for complete search history.

(56) References Cited

U.S. PATENT DOCUMENTS

| 7,751,409 | B1 * | 7/2010 | Carolan | H04L 41/5045 370/352 |
| 8,989,192 | B2 * | 3/2015 | Foo | H04L 45/306 370/392 |
| 9,215,093 | B2 * | 12/2015 | Han | H04L 12/4633 |
| 9,226,128 | B2 | 12/2015 | Kim et al. | |
| 9,461,729 | B2 | 10/2016 | Djukic et al. | |
| 9,532,213 | B2 | 12/2016 | Luft et al. | |
| 9,565,135 | B2 | 2/2017 | Li et al. | |
| 2014/0269716 | A1 * | 9/2014 | Pruss | H04L 45/38 370/392 |

(Continued)

FOREIGN PATENT DOCUMENTS

CN 105407056 A 3/2016
KR 10-1473738 B1 12/2014

Primary Examiner — Hong S Cho
(74) Attorney, Agent, or Firm — BakerHostetler

(57) ABSTRACT

An SDN controller configures a network element as a service edge. The SDN controller configures a service flow associated with a service to receive a required service treatment. The SDN controller configures an entry point to add routing tags on a set of packets associated with the service. The set of packets are routed in accordance with the routing tags. The required service treatment is applied at the service edge and the tags are removed from the set of packets, which are then forwarded to the network.

18 Claims, 3 Drawing Sheets

(56) References Cited

U.S. PATENT DOCUMENTS

| | | |
|---|---|---|
| 2015/0063112 A1* | 3/2015 | Wu .................. H04L 45/302 |
| | | 370/235 |
| 2015/0092551 A1* | 4/2015 | Moisand ............ H04L 12/4633 |
| | | 370/235 |
| 2016/0020946 A1 | 1/2016 | Morper |
| 2016/0080263 A1* | 3/2016 | Park .................. H04L 45/745 |
| | | 370/392 |
| 2016/0099874 A1 | 4/2016 | Hu et al. |
| 2016/0127886 A1 | 5/2016 | Hu et al. |
| 2016/0248673 A1* | 8/2016 | Beliveau ................ H04L 45/38 |
| 2016/0308981 A1* | 10/2016 | Cortes Gomez ........ H04L 67/16 |
| 2016/0344637 A1 | 11/2016 | Saha et al. |
| 2016/0381146 A1 | 12/2016 | Zhang et al. |
| 2017/0041209 A1 | 2/2017 | Joshi et al. |
| 2017/0180234 A1* | 6/2017 | Agrawal ............ H04L 63/1441 |
| 2018/0091603 A1* | 3/2018 | Sarangapani ......... H04L 67/142 |

* cited by examiner

SYSTEMS AND METHODS FOR TUNNEL FREE CONNECTIONLESS PACKET ROUTING TO A SERVICE EDGE

CROSS REFERENCE TO RELATED APPLICATIONS

This application is a continuation of, and claims priority to, U.S. patent application Ser. No. 15/479,505, filed Apr. 5, 2017, entitled "Systems And Methods For Tunnel Free Connectionless Packet Routing To A Service Edge," the entire contents of which are hereby incorporated herein by reference.

TECHNICAL FIELD

The subject matter disclosed relates generally to data networks and more particularly to tunnel-free connectionless packet routing to a service edge.

BACKGROUND

Traditional cellular architecture uses GGSN/P-GW as mobility anchor and perform service edge (SE) functions, for instance, traffic shaping, lawful interception, charging, etc. All the user packets are delivered to a Gateway GPRS support node (GGSN)/PDN gateways (PGW) through GPRS tunneling protocol (GTP) tunnels for the SE treatment then get routed to various packet networks. GTP is a group of IP-based communications protocols used to carry general packet radio service (GPRS) within GSM, UMTS and LTE networks. GTP is used to encapsulate user data when passing through core network and also carries bearer specific signaling traffic between various core network entities. The PGW is the IP anchor point and where bearer channels are established. The PGW provides the exit and entry point of traffic from the mobile provider's network to the user equipment. It is the service edge of the mobile provider's network, and much of the packet processing takes place there. For instance, packet inspection and filtering, policy enforcement and reporting all take place at the PGW. This connection-oriented mobility architecture incurs costly overhead for setting up, maintaining, and modifying the tunnels, which makes it very challenging for future mobility network which need to support emerging 10's billions of devices in 5 G.

Future mobility networks will need to support very diverse types of services with significant different requirements. For instance, V2V will require Ultra-reliable and low latency communications (e.g. connected car) while meter reader like IoT has low bandwidth and relaxed latency requirements. Also parental control is very important for video downloading on the smart phones, while devices like meter readers requires very limited SE services. So, the future mobility network need to have flexible dynamic SE architecture to support diverged types of services and requirements, unlike today's P-GW. We propose a flexible and dynamic SDN controlled per service based SE architecture, along with a tunnel-free connectionless packet routing to the service edge capability. With the native IP protocol suites (i.e., Connectionless), we can flexibly relocate the SE if necessary without worrying about all the signaling for tunnel setup and session migration.

There is a need to provide flexible dynamic Service Edge architecture to support diverged types of services and requirements, unlike today's P-GW. There is a need to extend a connection-less architecture framework into the service anchor (service edge) there is a need to provide management domain, i.e. packet delivery between Base-Station and SE in a connection-less manner to improve the scalability of the future mobility network. There is a need to be able to flexibly relocate the Service Edge if necessary without worrying about all the signaling for tunnel setup and session migration. There is a need to remove the dependency of GTP tunnels when we move towards 5 G. It provides the benefits of improving the future mobility network scalability/efficiency and improving end user experience.

SUMMARY

The invention satisfies the aforementioned needs in the art by providing systems and methods for providing tunnel-free connectionless packet routing to a service edge.

One general aspect includes a method including: requesting a service, configuring with an SDN controller a network element as a service edge, configuring a service flow associated with the service to receive a required service treatment, dynamically configuring with the SDN controller a service entry point to add a routing tag in each packet of a plurality of packets associated with the service so that each packet goes through a specified route to the service edge, applying the required service treatment at the service edge, and forwarding each of the plurality of packets to a network. Other embodiments of this aspect include corresponding computer systems, apparatus, and computer programs recorded on one or more computer storage devices, each configured to perform the actions of the methods.

One general aspect includes a system including: a processor, a storage device, an SDN controller, a network element, the storage device including instructions which when executed by the processor cause the system to perform operations including. The system also includes requesting a service. The system also includes configuring with the SDN controller a network element as a service edge. The system also includes configuring a service flow associated with the service to receive a required service treatment. The system also includes dynamically configuring with the SDN controller a service entry point to add a routing tag in each packet of a plurality of packets associated with the service so that each packet goes through a specified route to the service edge. The system also includes applying the required service treatment at the service edge. The system also includes forwarding each of the plurality of packets to a network.

One general aspect includes a computer-readable, non-transitory medium storing a program that causes a computer to execute a method including: requesting a service; configuring with an SDN controller a network element as a service edge; configuring a service flow associated with the service to receive a required service treatment; dynamically configuring with the SDN controller a service entry point to add a routing tag in each packet of a plurality of packets associated with the service so that each packet goes through a specified route to the service edge; applying the required service treatment at the service edge; and forwarding each of the plurality of packets to a network.

DETAILED DESCRIPTION OF ILLUSTRATIVE EMBODIMENTS

Figure 1:
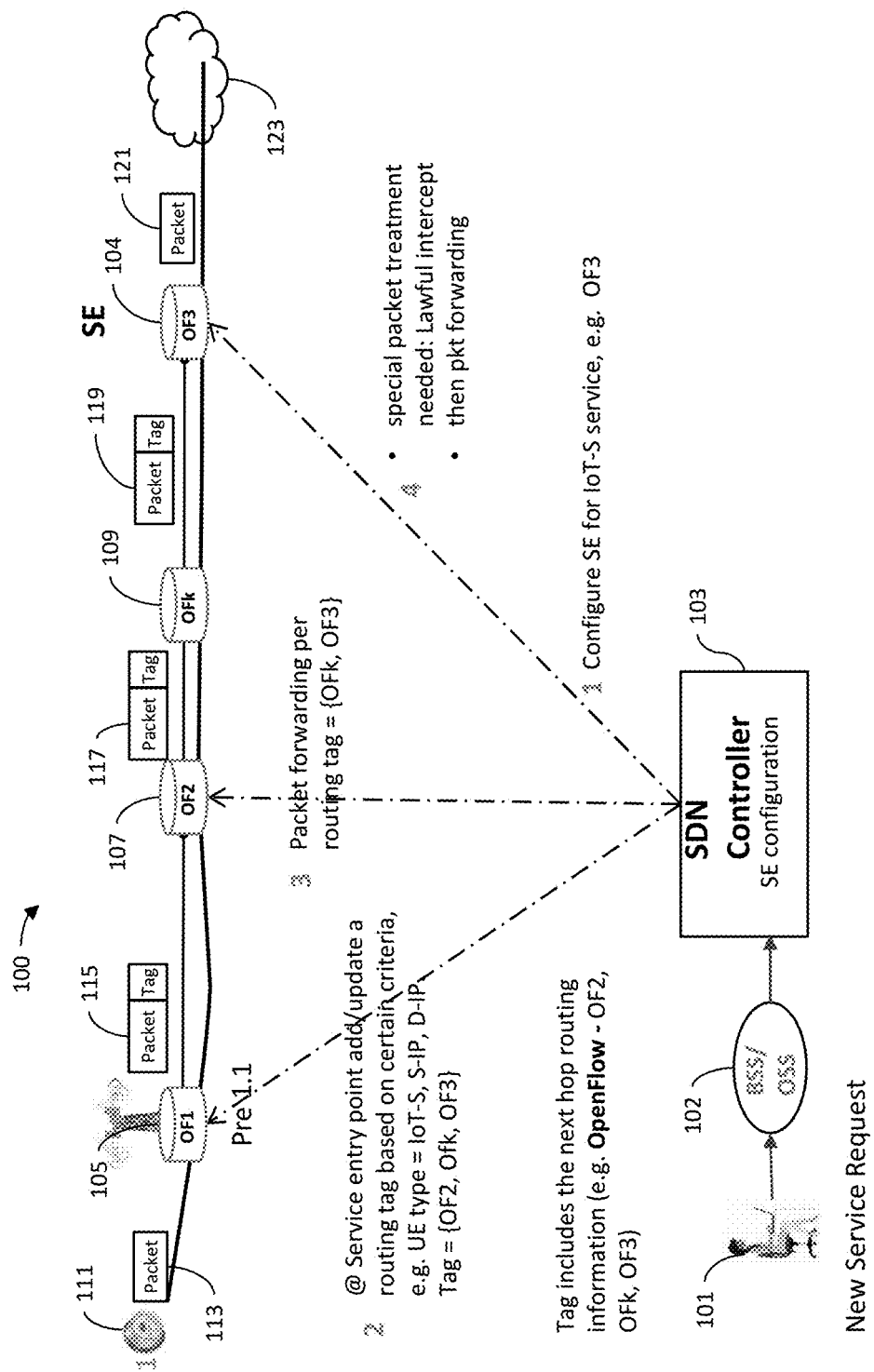
FIG. 1 is a block diagram of an embodiment of a system for tunnel-free connectionless packet routing to a service edge.

Illustrated in FIG. 1 is a block diagram of a connectionless architecture 100 in accordance with an embodiment. A user 101 requests a service through an operation support system/business support system application 102. The request for services routed to a software defined network controller (SDN controller 103). The SDN controller 103 configures a network element 104 (OF 3) as a service edge. A network element is usually is a manageable logical entity uniting one or more physical devices. This allows distributed devices to be managed in a unified way using one management system. Any layer 4 or above routers in the network could be a service edge since deep packet inspections (DPIs) are based on the IP and transport layer information.

The connectionless architecture 100 also includes an entry point network element 105 (OF 1) and may include a plurality of network elements e.g. network element 107 (OF 2) and network element 109 (OF k). Network element 104, network element 105, network element 107, and network element 109 may be configured to operate using an open flow (OF) protocol. Entry point network element 105 may be configured as an entry point for user equipment 111. User equipment 111 may be any device used directly by an end-user to communicate. It can be a handheld telephone, a laptop computer equipped with a mobile broadband adapter, or any other device. In one embodiment user equipment 111 may be an internet of things device (e.g. a meter, sensor, etc.), or any device that provides a source-IP, and a destination-IP. In one embodiment entry point network element 105 may add or update a routing tag based on certain criteria, for example an UE type, an Internet of things device, source IP or destination IP. As shown in FIG. 1 a packet 113 from user equipment 111 may be provided with a tag so that the packets 115 transmitted by entry point network element 105 include the routing information in the tag. The tag will include the route for the packets directed to network element 104 (the service edge). For example service entry point network element 105 may insert a tag (next hop routing information) on the packets received from user equipment 111 for routing the packets through network element 107 (OF 22) (packet 117), network element 109 (OF k) (Packet 119) and network element 104 (OF 3). By using the tag, no tunnel is required.

The SDN controller 103 may also configure the service function chaining at the service edge network element 104 for a given service flow to receive appropriate service treatment required, e.g. lawful intercept, etc. based on the business and service requirements. A service function is a function that is responsible for specific treatment of received packets. A service function can act at various layers of a protocol stack (e.g., at the network layer or other OSI layers). As a logical component, a service function can be realized as a virtual element. One or more service functions can be involved in the delivery of added-value services. A non-exhaustive list of abstract service functions includes the following categories of service functions: packet inspection (e.g. DPI); traffic optimization (video transcoding, TCP optimization, traffic shaping, DPI); protocol proxies (carrier grade NAT, DNS cache, HTTP proxy/cache, SIP proxy, TCP proxy, session border controllers, WebRTC gateways); and value-added services (ad insertion, header enrichment, WAN acceleration, advance advertising, URL filtering, parental control). A service function chain defines an ordered set of abstract service functions and ordering constraints that must be applied to packets and/or frames and/or flows selected as a result of classification. The implied order may not be a linear progression as the architecture allows for service function chains that copy to more than one branch, and also allows for cases where there is flexibility in the order in which service functions need to be applied. Service entry point network element 105 may also be configured to provide service chaining vector information that is responsible for specific treatment of received packages.

In addition, SDN controller 103 can dynamically collect network resource utilization information such as compute, storage, network, etc. physically and virtually, at each network and service node/element and decide the optimal routing and service chaining vector and provide the updated the routing tag at the service entry point network element 105.

Packets are routed as instructed in the routing information in tag. The intermediate route forwards the packet based on the routing information in the tag.

Upon receipt of the packets at the service edge network element 104, the packet/flow receives the subscribed service treatment, e.g. parental control, lawful intercept, etc. Service edge network element 104 then removes the tag and forwards the packets (packet 121) to a network 123.

Figure 2:
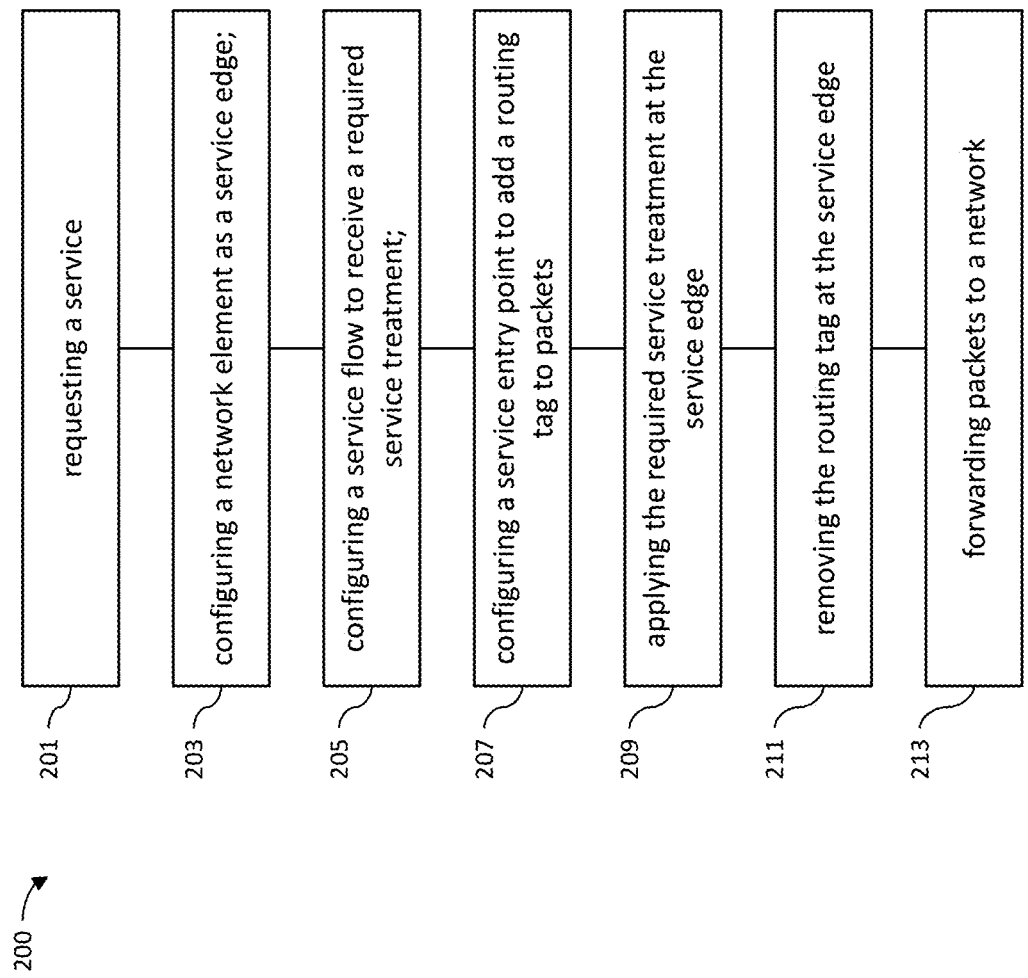
FIG. 2 is a flowchart of an embodiment of a method for tunnel-free connectionless packet routing to a service edge.

Illustrated in FIG. 2 is a flowchart of a method for tunnel free connectionless packet routing to a service edge.

In step 201 a user requests a service.

In step 203 a network element is configured as a service edge by an SDN controller.

In step 205 the SDN controller configures a service flow to receive a required service treatment. The configuring of the service flow may include configuring a service function chaining at the service edge.

In step 207 the SDN controller configures a service entry point to add a routing tag to packets. Configuring a service entry point may include adding a tag with routing and service chaining vector information setting out the specified route that the packets will travel. The packets may then be forwarded from an intermediate route based on routing and service chaining vector information in the routing tag.

In step 209 the required service treatment is applied at the service edge.

In step 211 the routing tag is removed at the service edge. The SDN controller may collect resource utilization information to decide an optimal routing and service chaining vector.

In step 213 the packets are forwarded to a network.

Figure 3:
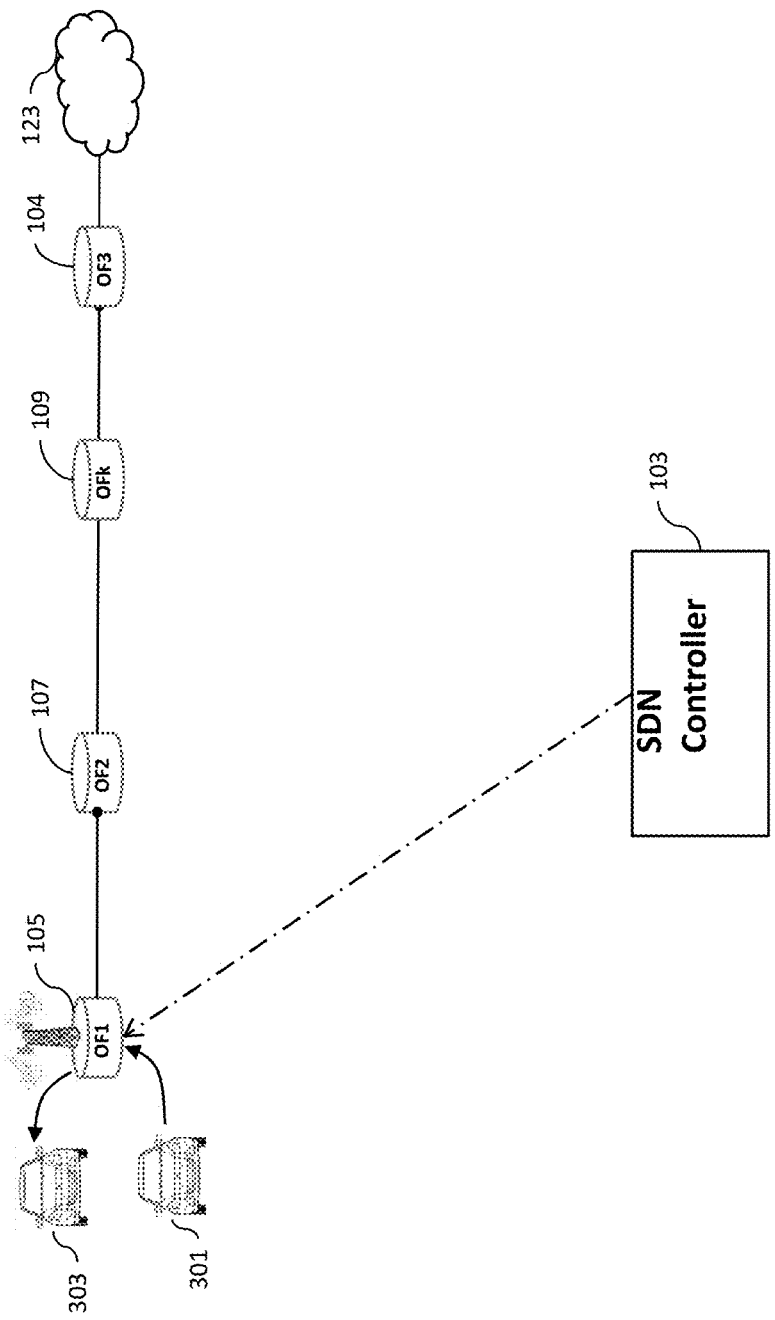
FIG. 3 is a block diagram of an embodiment of a system for tunnel free connectionless packet routing to a service edge in a vehicle to vehicle application.

FIG. 3 is a block diagram illustrating a connection less architecture 300 in accordance with an embodiment. The architecture includes SDN controller, network element 104 (OF 3), network element 105 (OF 1), network element 107 (OF 2) and network element 109 (OF k). In this embodiment vehicle 301 and vehicle 303 are configured to communicate with network element 105. SDN controller 103 configures network element 105 as a service edge for vehicle to vehicle (V2V) services. The V2V traffic is hairpinned (returning a message from an origin endpoint back in the direction it came from as a way to get it to its destination endpoint) at network element 105 so the routing tag={null}, and the packets do not travel through the network. Network element 105 serves as both the service edge and the entry point.

As described above, the exemplary embodiments can be in the form of processor-implemented processes and devices for practicing those processes, such as a server in a regional network or cloud data center. The exemplary embodiments can also be in the form of computer program code containing instructions such as floppy diskettes, CD ROMs, hard drives, or any other computer-readable storage medium or storage device, wherein, when the computer program code is loaded into and executed by a computer cause the system to perform operations implementing the methods described herein, and the computer becomes a device for practicing the exemplary embodiments. The exemplary embodiments can also be in the form of computer readable media or computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A method comprising:
    configuring, with a software defined network controller (SDN controller), a first network element to operate using an open flow protocol;
    configuring, with the SDN controller, the first network element as an entry point of a mobility network;
    configuring, with the SDN controller, a second network element to operate using the open flow protocol;
    configuring, with the SDN controller, the second network element as a service edge of the mobility network;
    receiving, at the first network element, a packet from a user equipment;
    adding a tag to the received packet based on a criterion, wherein the tag includes routing information;
    routing, based on the routing information, the packet to the second network element; and
    removing, by the second network element, the tag from the packet and forwarding the packet to an outside network.

2. The method of claim 1 wherein the criterion is selected from a group comprising user equipment type, internet of things device, source IP and destination IP.

3. The method of claim 1 wherein the entry point first network element is configured as an entry point for the user equipment.

4. The method of claim 3 wherein the user equipment is a device used by an end user to communicate.

5. The method of claim 1 further comprising configuring with the SDN controller a third network element to operate using the open flow protocol.

6. The method of claim 5 further comprising routing the packet through the third network element.

7. A system comprising:
    a processor;
    a storage device;
    a software defined network controller (SDN controller);
    a first network element;
    a second network element;
    the storage device including instructions which when executed by the processor cause the system to perform operations comprising:
        configuring, with the SDN controller, the first network element using an open flow protocol;
        configuring, with the SDN controller, the first network element as an entry point of a mobility network;
        configuring, with the SDN controller, the second network element using the open flow protocol;
        configuring, with the SDN controller, the second network element as a service edge of the mobility network;
        receiving, at the first network element, a packet from a user equipment;
        adding a tag to the received packet based on a criterion, wherein the tag includes routing information;
        routing, based on the routing information, the packet to the second network element; and
        removing, by the second network element, the tag from the packet and forwarding the packet to an outside network.

8. The system of claim 7 wherein the criterion is selected from a group comprising user equipment type, internet of things device, source IP and destination IP.

9. The system of claim 7 wherein the first network element is configured as an entry point for the user equipment.

10. The system of claim 9 wherein the user equipment is a device used by an end user to communicate.

11. The system of claim 7 further comprising a third network element and wherein the instructions when executed by the processor cause the system to perform operations further comprising configuring the third network element with the SDN controller to operate using the open flow protocol.

12. The system of claim 11 wherein the instructions when executed by the processor cause the system to perform operations further comprising routing the packet through the third network element.

13. A computer-readable, non-transitory medium storing a program that causes a computer to execute a method comprising:
    configuring, with a software defined network controller (SDN controller), a first network element to operate using an open flow protocol;
    configuring, with the SDN controller, the first network element as an entry point of a mobility network;
    configuring, with the SDN controller, a second network element to operate using the open flow protocol;
    configuring, with the SDN controller, the second network element as a service edge of the mobility network;
    receiving, at the first network element, a packet from a user equipment;
    adding a tag to the received packet based on a criterion, wherein the tag includes routing information;

routing, based on the routing information, the packet to the second network element; and removing, by the second network element, the tag from the packet and forwarding the packet to an outside network.

14. The computer-readable, non-transitory medium of claim 13 wherein the criterion is selected from a group comprising user equipment type, internet of things device, source IP and destination IP.

15. The computer-readable, non-transitory medium of claim 13 wherein the computer-readable, non-transitory medium storing the program that causes the computer to execute the method further comprising configuring the first network element as an entry point for the user equipment.

16. The computer-readable, non-transitory medium of claim 15 wherein the user equipment is a device used by an end user to communicate.

17. The computer-readable, non-transitory medium of claim 13 storing the program that causes the computer to execute the method further comprising configuring with the SDN controller a third network element to operate using the open flow protocol.

18. The computer-readable, non-transitory medium of claim 17 storing the program that causes the computer to execute the method further comprising routing the packet through the third network element.

* * * * *